United States Patent [19]

Sobel

[11] Patent Number: 4,873,874
[45] Date of Patent: Oct. 17, 1989

[54] MAGNETOELASTIC TORQUE TRANSDUCER

[75] Inventor: Jarl Sobel, Västerås, Sweden

[73] Assignee: Asea Brown Boveri AB, Västerås, Sweden

[21] Appl. No.: 246,271

[22] Filed: Sep. 19, 1988

[30] Foreign Application Priority Data

Sep. 28, 1987 [SE] Sweden ................................ 8703720

[51] Int. Cl.[4] ............................................... G01L 3/10
[52] U.S. Cl. .................................................. 73/862.36
[58] Field of Search ............... 73/862.36, 779, DIG. 2

[56] References Cited

U.S. PATENT DOCUMENTS

| 3,465,581 | 9/1969 | Hohenberg | 73/862.36 |
| 4,506,554 | 6/1983 | Blomkvist | |
| 4,541,289 | 9/1985 | Valdemarsson | 73/DIG. 2 |

FOREIGN PATENT DOCUMENTS

| 3704049 | 9/1987 | Fed. Rep. of Germany . | |
| 0245033 | 10/1986 | Japan | 73/862.36 |
| 667836 | 12/1977 | U.S.S.R. . | |
| 838448 | 12/1977 | U.S.S.R. . | |

OTHER PUBLICATIONS

Yamesaci et al., "Torque Sensors Using Wire Explosion Magnetostrictive Alloy Layers", IEEE Transactions on Magnetics; vol. 2, MAG-22, No. 5, Sep. 1986.
K. Harada et al. "A New Torque Transducer Using Stress Sensitive Amorphous Ribbons", IEEE Transactions on Magnetics; vol. MAG-18, No. 6, p.1767, Nov. 1982.
I. Sasada et al., "Torque Transducers With Stress-Sensitive Amorphous Ribbons of Chevron Pattern", IEEE Transactions on Magnetics; vol. MAG-20, No. 5, p. 961, Sep. 1984.

Primary Examiner—Joseph A. Orsino
Assistant Examiner—Hollis T. Chen
Attorney, Agent, or Firm—Watson, Cole, Grindle & Watson

[57] ABSTRACT

A magnetoelastic torque transducer comprises a shaft, three stationary coils connected in series to magnetize the shaft and three coils to sense moment transmitted in the shaft, and a magnetic casing surrounding the coils. The shaft has three parallel annular zones provided with such anisotropy that the magnetic field in the shaft is deflected by an angle α relative to a generatrix to the shaft in the outer zones and is deflected by an angle α to a generatrix to the shaft in the middle zone, the axial extension of both outer zones being substantially half that of the intermediate zone. The angle α should be at least 45° in order to obtain good sensitivity in the transducer. The excitation coils are arranged concentrically to the shaft, each being located outside an annular zone and the outer excitation coils being wound with substantially half as many turns as the central excitation coil. Concentric with each excitation coil is a measuring coil, the outer measuring coils being wound with substantially half as many turns as the central measuring coil and this being arranged to be inverse-connected to the outer measuring coils.

6 Claims, 2 Drawing Sheets

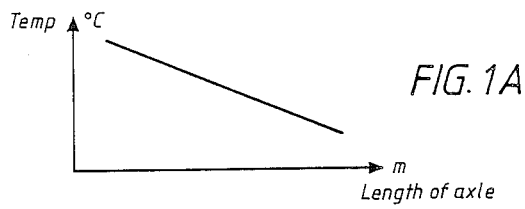
FIG. 1A
FIG. 1B
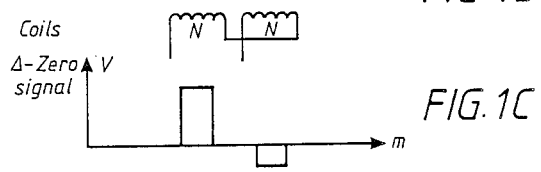
FIG. 1C
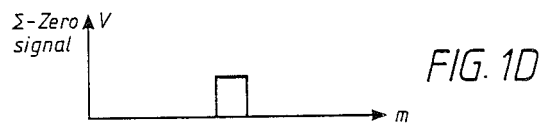
FIG. 1D
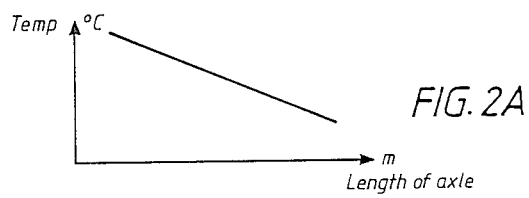
FIG. 2A
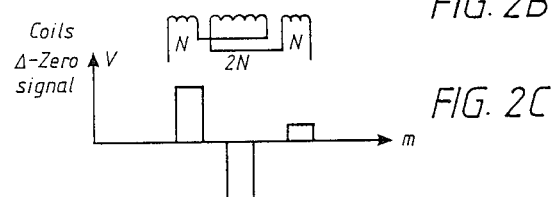
FIG. 2B
FIG. 2C
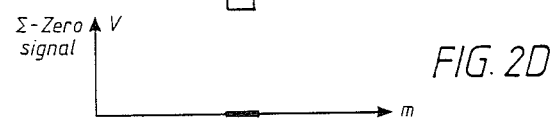
FIG. 2D

MAGNETOELASTIC TORQUE TRANSDUCER

TECHNICAL FIELD

The present invention relates to a transducer enabling contactless measurement of torsional moment on a rotating or stationary shaft. The transducer is of magnetoelastic type and designed as a symmetrically rotating body. The transducer is particularly useful in applications where the measuring zones on the shaft have a temperature gradient, i.e. when a thermal flux passes through the shaft.

BACKGROUND ART

Magnetoelastic torque transducers rotating symmetrically and similar in design to the invention are known through a number of patent specifications and articles, some of which will be commented upon below.

The common measuring principle and common feature of these known solutions is that zones have been created in the magnetoelastic material with anistropy or magnetic orientation substantially coinciding with the compressive or tensile stresses appearing in a shaft, at ±45° in relation to a generatrix to the shaft, when this is caused by the load to twist. In this way the reluctance in a zone whose direction of magnetization coincides with the tensile stress will be reduced and the reluctance in zones coinciding with the compressive stress will increase, thus causing a corresponding increase or decrease in the flow through the zones. This is applicable in the case of positive magnetostriction.

By measuring the difference in reluctance between two zones in which the anisotropy in one zone is directed along the direction of pull and that in the other zone along the direction of pressure, a measurement of the torque is obtained which has little sensitivity to axial forces of flexural stresses.

The difference in reluctance between the zones is usually measured by creating a time-dependent H-field via a primary coil concentric to the shaft, directed along the shaft and having equal amplitude in both zones. The difference in B-field between the zones is then measured using two identical secondary coils, one above each zone. The easiest way to do this is by inverseconnecting the secondary coils in such a way that the stresses induced in each coil are subtracted from each other. Phasesensitive rectification of the secondary signal obtained in this manner also enables torques of different direction to be distinguished.

The difference between the torque transducers mentioned below, besides the choice of magnetostrictive material, lies in the different methods of creating the required anisotropy.

According to Russian Pat. No. SU 667836 the anistropy is created by cutting slits in the surface of the shaft.

Russian Pat. No. SU 838448 describes a transducer in which an attempt is made to increase sensitivity instead by producing the slits by roll-embossing this pattern in the surface.

American U.S. Pat. No. 4,506,554 covers a transducer in which the anisotropy is achieved by using a sleeve with slit cut in the main stress directions.

A very similar design is also described in IEEE Trans Magn Vol Mag-22 No. 5 p. 403 (Sep. 1986) in an article entitled "Torque sensors using wire explosion magnetostrictive alloy layers" by J. Yamasaki, K. Mohri et al. Here a 100 micrometer thick "sleeve" has been produced, with through-"slits" on a stainless steel shaft by spraying the shaft with drops of a molten magnetoelastic alloy through a mask. The technique used consists of allowing a strong electrical discharge to pass through a conductor in the relevant material, whereupon the core is vaporized and the conductor explodes.

An article by K. Harada, I. Sasada et al in IEEE Trans Magn Vol Mag 18, No. 6, p. 1767 entitled "A new torque transducer using stress sensitive amorphous ribbons" describes a solution comprising glueing a stress-relieved foil of amorphous magnetostrictive material onto a shaft which has been prestressed with a certain torque. When the glue has dried, the prestressing will disappear and produce an anisotropy since the foil will now be prestressed.

In "Torque transducers with stress-sensitive amorphous ribbons of chevron-pattern", published in IEEE Trans Magn Vol Mag-20, No. 5, p. 951, I.Sasada, A.Hiroike, and K.Harada describe how anisotropy can instead be created by glueing strips of amorphous magnetoelastic material onto a magnetic or non-magnetic transducer shaft in its principle stress directions.

Offenlegungsschrift DE 3704049 A1 mentions a method of creating anisotropy by placing a conductor pattern on a shaft of magnetostrictive material. This conductor pattern has the same shape as the slits mentioned earlier.

Torque transducers of this type generally offer good measuring qualities for the majority of applications. However, in a few special applications problems of measuring accuracy may occur. If a thermal flux passes through the shaft, i.e. if there is a temperature gradient in the shaft, this will affect the measurement. It is known from the literature that the permeability of magnetic material is extremely temperature-dependent. If, therefore, a temperature difference exists across the measuring zones of the shaft, the measured signal will not correctly indicate the torque, due to the varying permeability within the measured zone. Applications in which these problems may occur can be found in many areas. Temperature differences of several hundred degrees may occur, for instance, between a combustion engine and its gearbox or coupling. A thermal flux will therefore pass through the shaft connecting these parts and the measuring accuracy will thus be affected when measuring torque in the shaft. An electric motor may be located in a well heated machine room and, due to high load, may reach a maximum temperature permitted for the motor. The machine being driven may be located outdoors and connected to the motor by a shaft passing through a wall and there is every likelihood of the shaft acquiring a temperature gradient which may cause problems in the measuring accuracy.

As far as we know, no information exists in the available literature, concerning the temperature-dependence of the permeability for the materials used in connection with magnetoelastic torque transducers of this type, i.e. both annealed and cold-rolled silicon steel. Some idea of expected magnitudes can, however, be deduced from a book published in 1951 by D van Nostrand Company Inc, Princetown, N.J., "Ferromagnetism" by Bozorth. This includes measurements applicable to pure iron which has been stress-relieved to 800° C.

From this book, appendix 1, FIG. 3–8, it can be seen that both the initial permeability $\mu_0$ and the maximum permeability $\mu_m$ increase as the temperature increases.

It can be seen from the figures that $\mu_m$ increases by a factor of two at 200° C., i.e. that $$\mu = \mu_{T=0° C.} (1+T/200)$$

or, in other words, that $\mu$ increases by 0.5%/°C.

The magnetostrictive permeability alteration due to the tensile stress in a stress-relieved strip of the material used in the type of torque transducer under consideration has been measured and is at least 1%/MPa.

For a moderately loaded transducer where the material is loaded to 20 MPa, therefore, maximal loading would give the same permeability alteration as a temperature alteration of 40° C. This would thus give a neutral drift of 1/40 = 2.5% of max. signal per °C. temperature difference between the measured zones.

The above estimate is extremely rough and assumes, for instance, that the magnetostrictive permeability alteration for compressive stresses is substantially the same as that measured for tensile stresses. However, the estimated value should be representative for the maximum neutral drift caused by temperature gradients. This also shows that in applications where temperature gradients are likely in the shaft measuring zones, and where measuring must be rather accurate, measures must be taken to eliminate or greatly reduce the effect of the heat flux passing through the shaft.

The invention to be described now shows a device which reduces the sensitivity to temperature gradients in magnetoelastic torque transducers in an extremely reliable manner.

BRIEF DESCRIPTION OF THE DRAWINGS

FIGS. 1A-1D show how a temperature gradient in a shaft/measuring sleeve affects the zero signal of a magnetoelastic torque transducer designed in accordance with today's technology. The necessary anisotropy in the measuring zones is indicated here by slanting lines.

FIGS. 2A-2D show the principle of a magnetoelastic torque transducer according to the invention, which radically reduces the influence of a temperature gradient within the measuring zones of a shaft/measuring sleeve.

DISCLOSURE OF THE INVENTION

With the aid of FIGS. 1A-1D, we shall start by showing how a temperature gradient influences the zero signal, i.e. the output signal of the transducer when the shaft is not transmitting any torque. If the shaft is loaded, of course, the zero signal caused by a temperature gradient will be added to the relevant torque signal.

In an unloaded shaft according to FIG. 1B is subjected to a temperature gradient according to FIG. 1A, due to the different permabilities prevailing in each measuring coil, the measuring coils will emit a Δ zero signal in accordance with FIG. 1C, resulting in a Σ-zero signal in accordance with FIG. 1D. As is evident from FIG. 1B, the excitation coils of the transducer have been omitted.

A torque transducer according to the invention is shown in FIG. 2B. The shaft here has three parallel annular zones provided with such anisotropy that the magnetic field in the shaft is deflected by an angle relative to a generatrix to the shaft in the outer zor (3,5) and is deflected by an angle α to a generatrix to t shaft in the middle zone (4). The axial extension of ea of the two outer zones is substantially half that of t intermediate zone. The angle α should be at least 45° order to obtain good sensitivity in the transducer.

The excitation coils, not shown in FIG. 2B, are cc nected in series in the normal way.

The measuring coils for the two outer zones are p: vided with an equal number of turns N and the coil the central zone has a number of turns substantia corresponding to the sum of the two outer coils, i.e. 2 As can be seen in FIG. 2B, the outer coils are seri connected and the measuring coil of the central zon inverse-connected in relation to the two others.

As revealed in FIGS. 2C and 2D, the resultant z signal from a temperature gradient will be practica zero. A torque transducer of the type described c therefore by used for applications when a thermal c rent passes through the shaft. In the case of a station: thermal flux, i.e. a linear temperature gradient, the in ence of the thermal flux on the permeability, and t on the measured signal, can thus be fully compensa and sensitivity to other more complicated gradient: greatly reduced.

DESCRIPTION OF PREFERRED EMBODIMENTS

Figure 3:
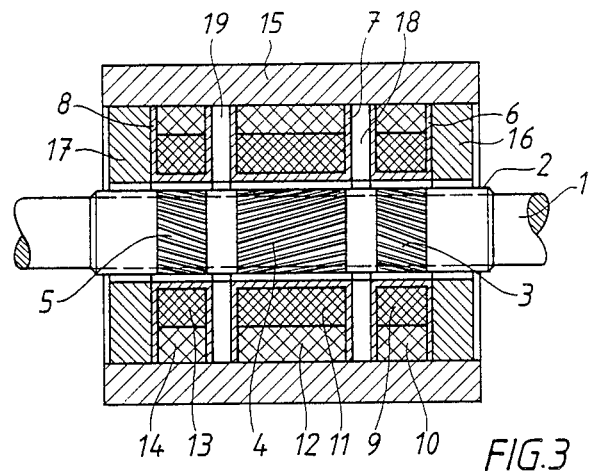
FIG. 3 shows a preferred embodiment of a transducer according to the invention.

FIG. 3 shows an embodiment of a magnetoelas torque transducer according to the invention. The isotropy is achieved here in the same way as in transducer described in U.S. Pat. No. 4,506,554.

A measuring sleeve 2 is secured about a shaft 1 such a manner that it is unable to twist. The sleeve provided with three annular zones 3, 4, 5, the a> length of zones 3 and 5 being equal and slits being ranged in the same direction in relation to a genera to the sleeve and inclined substantially 45° to the ger atrix. The axial length of measuring zone 4 is twice t of the other two and this zone is provided with having the same pitch but directed at 90° to the slit: zones 3 and 5. Each of the measuring zones 3, 4, : surrounded by concentric bobbins 6, 7 and 8, station with the shaft, and by coils 9, 10 and 11, 12; 13, 4, spectively. Coils 10, 12 and 14 are used for excitat with alternating current with the coils connected series and with the coils 9, 11 and 13 which are usec sense a torque applied on the shaft. Coil 11 is inve: connected to the two outer coils. The electrical conn tion can be seen in FIG. 4. An iron core 15 in the fc of a rotary body with U-shaped generating surface : rounds the coils, the air-gap towards the shaft at the t annular outer parts 16, 17 of the iron core.

The spaces 18 and 19 may be filled by circular disc magnetic material, giving the excitation flux somew better distribution than if these spaces are filled v discs of insulating material. In this version the side w of the bobbins may be made so wide that the bobl can be fitted close together, or all coils can be wo onto one bobbin with turned openings correspondin the three separate bobbins shown in the figure. In s case it is advisable for the excitation coil to be wo evenly over all the measuring zones.

Figure 4:
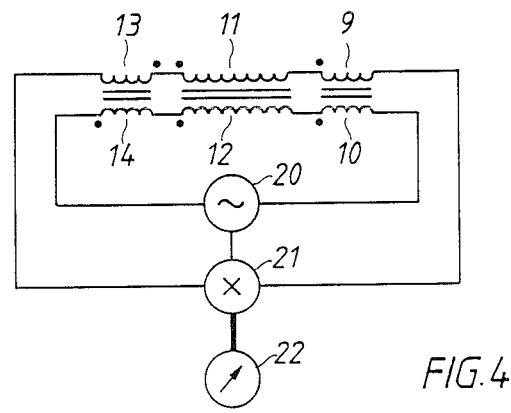
FIG. 4 shows the principle of a circuit for supplying the excitation coils and measuring the signals from the measuring coils.

FIG. 4 shows that coils 10, 12 and 14 are supplie series from an alternating current source 20, and coils 9, 11 and 13 are connected so that coil 11 is verse-connected to the other two and that the total signal is rectified in the controlled rectifier 21 and presented on an instrument 22.

Figure 5:
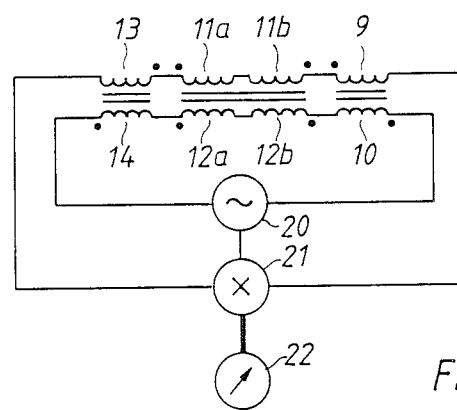
FIG. 5 shows an alternative embodiment of a circuit for supplying the excitation coils and measuring the signals from the measuring coils.

According to FIG. 4, the primary flow is directed in one and the same direction because the excitation coils are connected in seris. It is of course quite possible for the magnetic field to be directed in different directions in each half of the transducer. This method of connection can be seen in FIG. 5, i.e. with the excitation coils 10, 12a, 12b and 14 wound and connected to obtain different magnetization directions. The central measuring coil must then of course be divided in order to obtain the desired inverse-connection. The two central coils are wound with half as many turns as the central coils described earlier.

Since there will always be a certain leakage flux at the ends of such a construction, the flux at the central measuring zone will be slightly stronger than at the two outer zones if the central excitation coil has twice as many turns as the outer coils. To ensure minimum influence from the temperature gradient, therefore, the number of turns of either the central excitation coil or the central measuring coil may be made slight less than twice those of the two outer coils.

It is claimed:

1. A magnetoelastic torque transducer comprising a shaft, stationary coils concentric with the shaft in order to excite the transducer with alternating current, and stationary coils concentric with the shaft to measure the external torsional moment applied on the shaft, and a magnetic casing also located concentrically with the shaft, where said shaft has three parallel annular zones provided with such anisotropy that the magnetic field in the shaft is deflected by an angle $\alpha$ approximately equal to 45° to a generatrix to the shaft in the outermost zones and is deflected by an angle $\alpha$ approximately equal to $-45°$ to a generatrix to the shaft in the intermediate zone, the axial extension of both outer zones being substantially half that of the intermediate zone and where the excitation is arranged using three separate coils, connected in series, each being located concentric with an annular zone and the outer excitation coils being wound with substantially half as many turns as the central excitation coil and that concentric with each excitation coil is a measuring coil, the outer measuring coils being wound with substantially half as many turns as the central measuring coil and this being arranged to be inverse-connected to the outer measuring coils.

2. A magnetoelastic torque transducer as claimed in claim 1, where the number of coil turns on the central excitation coil is less than double the number of turns on the outer excitation coils.

3. A magnetoelastic torque transducer as claimed in claim 1, where the number of coil turns on the central measuring coil is less than double the number of turns on the outer measuring coils.

4. A magnetoelastic torque transducer as claimed in claim 1, where the transducer is arranged with circular discs of magnetic material in the space between the coils.

5. A magnetoelastic torque transducer, comprising a shaft, stationary coils concentric with said shaft to excite said transducer with alternating current, and stationary coils concentric with said shaft to measure the external torsional moment applied on said shaft, and a magnetic casing also located concentrically with said shaft, said shaft having three parallel annular zones provided with such anisotropy that the magnetic field in said shaft is deflected by an angle $\alpha$ approximately equal to 45 degrees to a generatrix to said shaft in the outermost zones and is deflected by an angle $\alpha$ approximately equal to $-45$ degrees to a generatrix to said shaft in said intermediate zone, the axial extension of both outer zones being substantially half that of the intermediate zone and said excitation is provided by one excitation coil wound uniformly across all three zones, and a measuring coil concentric with said excitation coil.

6. A magnetoelastic torque transducer, comprising a shaft, stationary coils concentric with said shaft to excite said transducer with alternating current, and stationary coils concentric with said shaft to measure the external torsional moment applied on said shaft, and a magnetic casing also located concentrically with said shaft, said shaft having three parallel annular zones provided with such anisotropy that the magnetic field in said shaft is deflected by an angle $\alpha$ approximately equal to 45 degrees to a generatrix to said shaft in the outermost zones and is deflected by an angle $\alpha$ approximately equal to $-45$ degrees to a generatrix to said shaft in said intermediate zone, the axial extension of both outer zones being substantially half that of the intermediate zone and said excitation is provided by two identical excitation coils connected together so that the magnetic flux in each said excitation coil is directed in the opposite direction to that in the other, and outer excitation coils connected so that their respective magnetic fluxes cooperate with the magnetic flux of the adjacent, central excitation coil, and two identical measuring coils, each being electrically inverse-connected to an adjacent outer measuring coil, the measuring coils being electrically inverse-connected so that the resultant torque can be measured.

* * * * *